Aug. 15, 1961   A. M. BARRETT, JR   2,996,621
ELECTRONIC STEERING FOR INDUSTRIAL TRUCKS
Filed April 1, 1958
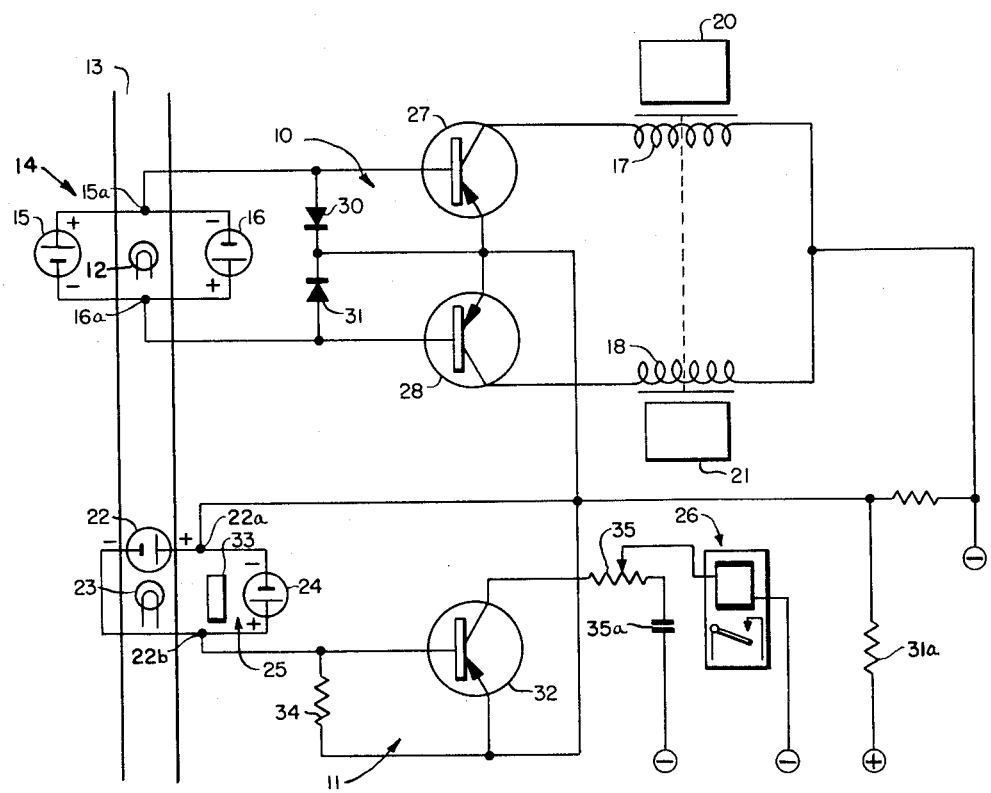
INVENTOR
ARTHUR M. BARRETT JR.
BY
ATTORNEYS _United States Patent Office_ 2,996,621
Patented Aug. 15, 1961

2,996,621
ELECTRONIC STEERING FOR INDUSTRIAL TRUCKS
Arthur M. Barrett, Jr., Lake Forest, Ill. (% Barrett Electronics Corp., 630 Dundee Road, North Brook, Ill.)
Filed Apr. 1, 1958, Ser. No. 725,663
8 Claims. (Cl. 250—202)

This invention relates, in general, to guidance systems for controlling movement of mobile objects along a predetermined course, and, in particular, to an electronic guiding system having a new and improved control circuit using light sensitive means for signalling purposes.

It is a general object of this invention to provide a new and improved control circuit including light sensitive means and transistor means for use in a guidance system for controlling the movement of mobile objects along a predetermined course.

Electronic guidance systems, such as herein contemplated, are suitable for many applications including automobiles traveling along highways, toys having means providing a predetermined path which the toy is to follow, and are particularly useful for controlling the movement of industrial trucks such as lift-trucks and the like in a factory. "Guidance systems," as used herein, includes a mobile object adapted to follow a predetermined course and a circuit including light sensitive means and transistor means operatively connected to a steering control means of the mobile object for directing its travel relative to the predetermined course.

Known guidance systems utilizing light sensitive means have heretofore incorporated complex circuitry including expensive and complicated means for amplifying the signal output of the light sensitive means for coupling to the mobile object control means. Most of these systems have been impractical in that they have been expensive to build, to maintain and to operate. Many of the systems were further impractical because they were not sufficiently sensitive and frequently had a tendency to drift out of adjustment causing erratic operation of the mobile unit. Such shortcomings, when experienced in combination with changes in battery voltage, variations in light due to bulb life, etc., previously created problems in prior art systems which seriously impaired the advance of the art.

Accordingly, it is an object of this invention to provide an electronic guidance system for mobile objects overcoming one or more of the disadvantages of prior art systems, and specifically to provide an extremely sensitive guidance system control circuit and monitoring circuit using means whereby mobile objects may be steered over a predetermined guide path.

In accordance with this invention, the electronic guidance system includes a means sensitive to light reflected from a light reflective band or strip defining the predetermined path for the mobile object to travel, which light sensitive means transmits control output signals according to its position relative to the path. These output control signals are interpreted as steering instructions by a control means coupled to the mobile object for effecting guidance of the mobile object along the course defined by the strip or band, and these steering instructions are proportional to the lateral displacement of the mobile object from the predetermined course and are amplified for use by the control means by a new and improved transistor circuit. This system further includes means for monitoring the system to determine whether or not the mobile object is actually on or off the predetermined path.

Other and more particular objects of my invention will be apparent to those skilled in the art from the following description and drawing forming a part hereof and wherein, there is shown a schematic drawing of the new and improved circuit of my invention schematically connected to a control means for a mobile object.

Turning now to the embodiment illustrated, it can be seen that there is provided a guidance system including an electronic steering control circuit, illustrated in its entirety as 10, and monitoring circuit, illustrated in its entirety as 11. The steering control circuit broadly comprises a light source 12 for projecting light onto a light reflective strip 13, and a light responsive means or optical system 14, comprising two self generating cells or sensing units 15 and 16, preferably of the solar cell type, connected in opposition in a loop circuit to provide a differential signal output which is related in amplitude and polarity to the location of the light source 12, and optical system 14 relative to the light strip 13. In the normal "on-track" tracking position of the mobile unit, the cells are located on opposite sides of the guide strip at equal distances therefrom, and the control signal output of the solar cells 15 and 16 is transmitted to a differential relay, shown schematically as two coils 17 and 18, which form a part of a steering control means, shown schematically at 20 and 21, and which include conventional steerable mechanism to which the relay is operatively connected and mounted on a mobile object or unit (not shown). Thus, by a suitable arrangement of the coils 17 and 18, the mobile object will be steered by the steering instructions received from the light sensitive means 14 and transmitted to the differential relay according to the mobile unit's position with respect to the guide path 13.

The monitoring system 11 comprises a first solar cell 22 which is energized by light reflected from guide strip 13 directed thereto from light source 23, and a second solar cell 24 connected in opposition to solar cell 22, and which is energized by light received directly from light source 23, both of which cells form a light sensitive means 25 which is coupled to an on-off switch 26 in the form of a relay. A predetermined change in the value of the current signal output of the light sensitive means 25, which occurs with a predetermined decrease in the intensity of light reflected to the solar cell 22, will effect operation of the relay to disconnect the power supply or ignition system, as the case may be, for the motive means (not shown) of the mobile object.

As hereinbefore mentioned, an important feature of my invention is a means for amplifying and coupling the steering instructions from the solar cells 15 and 16 to the coils 17 and 18 of the differential relay. The coupling circuit basically comprises a pair of transistors 27 and 28 (of the PNP type in the present example), the base of the transistor 27 being connected to the common terminal 15a between the positive and negative elements of the series wired cells 15 and 16, respectively, and the base of the transistor 28 being connected to the common terminal 16a for the negative and positive elements of cells 15 and 16 respectively. Rectifier 30 is connected between the emitter and base elements of the transistors 27, and rectifier 31 is connected between the base and emitter elements of transistor 28 to conduct in the directions shown on the drawing; the emitters being commonly connected to the rectifiers 30, 31, and also over resistor 31a to the positive potential terminal of the source. The collector elements of the transistors 27 and 28 are connected over the windings 17 and 18, respectively, to the negative terminal of the power supply source. The nature of the polarity connections with the use of NPN type transistors will be apparent to parties skilled in the art.

In steering circuit 10, it can be seen that the amplitude and polarity of the current output of the solar cells 15 and 16 to the transistors 27, 28 will be determined by the position of the path 13 with respect to the cells 15 and 16. Assuming, for purposes of illustration, that the optical pickup unit 14 is located with the cells 15, 16 positioned equidistant from the strip 13, both solar cells are operative to generate a signal of a moderate amplitude, the signals being substantially of equal value and, as coupled to terminals 15a, 16a of the loop, are of opposite polarity. Ostensibly with such condition, the output of the solar cells, as coupled to transistors 27 and 28, is of substantially zero value. Since the transistor base elements are thus at a substantially zero value with respect to the emitter elements, the transistors are substantially cut-off, and there is little or no current flow in the collector elements to the differential relay windings 17 and 18. If a slight current flow occurs through the respective windings the balanced nature of the flow through the two windings of the differential relay ostensibly maintains same in its neutral position.

In the event of movement of the light sensitive system from its illustrated tracking position on the guide strip 13, the output signals of the solar cells will be correspondingly altered and by reason of the illustrated connections, an extremely high gain output signal is produced. Assuming, for example, that the optical unit 14 is displaced to the left of its illustrated position on the drawing, the output signal of cell 15 is correspondingly reduced, and the output signal of cell 16 is correspondingly increased. The differential signal output of cells 15 and 16, as coupled to the transistors 27, 28, is of an amplitude related to the algebraic sum of the individual signal outputs of cells 15 and 16 by reason of their opposed connection, and of a polarity to render rectifier 31 conductive and rectifier 30 non-conductive (i.e., terminal 16a positive relative to terminal 15a as a result of cell 15 being less conductive and cell 16 being more conductive). Rectifier 31 is accordingly rendered conductive and rectifier 30 remains nonconductive, and the emitter elements of transistors 27, 28 are made more positive. The base of transistor 28 is also made positive by reason of its connection to terminal 16a. The base of transistor 27 however, by reason of its connection to terminal 15a (which is negative relative to terminal 16a) and the non-conductive condition of rectifier 30 is negative relative to the emitter element of transistor 27, and a current flow is effected over the collector circuit of transistor 27 and differential relay winding 17 to energize the same. In that the emitter and base elements of transistor 28 are at substantially the above value with rectifier 31 conductive the transistor 28 is maintained at cut-off or substantially cut-off. The manner in which the optical unit effects current flow over the differential winding 18 responsive to movement of the optical unit 14 to the right of its illustrated position will be obvious from the foregoing description.

The value of current flow is, of course, related to the value of the individual signal outputs of the cells 15, 16, in that lateral displacement of the unit from its "on-track" position controls both cells to adjust their output to effect course correction (i.e., one cell goes more negative and the other cell simultaneously goes more positive). An extremely high gain signal is immediately provided responsive to the slightest displacement of the mobile unit from the track. In actual embodiments, with even moderate departures of the optical unit from the path, the changes in the current to the respective cells will drive one transistor or the other (depending on the direction of displacement from the track) to saturation. The relay unit is selected to operate at substantially less than the saturation value of the transistors whereby even with changes in the value of the potential of the supply source, or changes in the reflective nature of the strip, reliable operation is experienced.

In monitor circuit 11, as herein previously mentioned, the light responsive means 25 comprises two interconnected solar cells 22 and 24, with one cell 24 located for direct illumination by light source 23 and with the other cell 22 located centrally of the strip with the mobile unit in its midtrack position to be responsive to light reflected from strip 13. The cells are connected in opposed relation, the positive and negative elements of cells 22 and 24 respectively being connected to terminal 22a and the negative and positive elements of cells 22 and 24 respectively being connected to terminal 22b, whereby the cells as energized transmit a signal related to the algebraic sum of the individual outputs to the transistor 32. The signals, as shown, vary in amplitude with movement of monitor circuit 11 relative to the light output of bulb 23 as reflected by the guide strip 13. While I have shown the bulbs 23 and 12 as separate, the solar cells 15, 16, 22 and 24 are arranged in actual embodiments to operate from one bulb only, the steering and monitor cells being mounted on a U-shaped head with a common light source, the steering cells being mounted in the arms and the monitor cells being mounted on the base of the U-shaped head. By means of a conventional shutter means, the solar cells 22 and 24 are adjusted to balance each other to provide a predetermined signal ratio and once adjusted, any variation in light due to the life of the source or due to reduced source voltage, will be immaterial as the same change in intensity will affect the output of both cells in a like manner.

Changes in the differential signal output of the solar cells 22 and 24 responsive to a variation in the intensity of the light applied to cell 22 by reason of the change of position of the mobile unit with respect to strip 13, are coupled over terminals 22a, 22b to the transistor device 32, which includes a base element connected to terminal 22b and an emitter element which is connected to terminal 22a and also over resistor 31a to the positive terminal of the source. Base resistor 34 is connected between the base element and the emitter element, and a collector element is connected over variable resistor 35 and an off-on switch 26 to the negative terminal of the power source. Switch 26 is in turn connected to suitable means for interrupting the current to the motive power means of the mobile unit in the event that the light sensitive means 25 indicates that the mobile unit is no longer on the path 13.

In operation, the shutter is initially set to provide a predetermined differential between the outputs of the respective cells 22, 24, which difference in the signal outputs (by reason of the connection of the positive terminal of cell 22 and the negative terminal of cell 24 to the emitter of transistor 32, and the connection of the negative terminal of cell 22 and the positive terminal of cell 24 to the base of transistor 32) will be coupled across the base and emitter elements of the transistor 32. In the normal illustrated position of the mobile unit relative to the guide strip, the diaphragm is set so that the signal ouput of cell 24 is less than the signal output of cell 22, whereby the base element is negative relative to the emitter element, and transistor 32 conducts a current sufficient to energize the relay 26 when the mobile unit is in its normal on-track condition. Relay 26 is held operated and at its contacts 27 maintains the control circuit for the power unit to the mobile object.

As the optical system is moved from its tracking position in either direction, the differential signal decreases in value since the output signal of cell 24 remains constant, and the output signal of cell 22 decreases as the system is moved laterally of the track. As the differential signal decreases sufficiently, the output of cell 24 exceeds the output of cell 22 and the base element of transistor is driven positive relative to the emitter element, and the transistor becomes non-conductive to effect the release of the relay 26, and the interruption of the energizing circuit for the mobile unit.

The monitoring system as thus constituted permits adjustment of the transistor to operate at its cut-off range, such arrangement being desirable in that the transistor is not operated from one quiescent point to another with consequent problems of instability due to temperature effects. In practice, the monitor system is preferably connected in accordance with "dead man" principles whereby the control relays, such as the monitor control relay are normally energized with operation of the mobile unit, and which are de-energized responsive to an interruption of the power supply of any type. It will be apparent, however, that the alternative form of control may be readily provided by reversal of the connections of the self-generating cells 22, 24.

A resistor capacitor network 35, 35a, may be provided to "smooth" the signal input to the monitor relay, if desired. That is, it may be desirable in certain installations to provide a slight added delay prior to operation of the cut-off device and the illustrated resistance capacitor circuit serves such purpose.

The stable nature of the self-generating cells insures the provision of an extremely stable control signal in both monitor and steering systems, and in actual practice, as used in the illustrated circuit, the self-generating cells and transistor units provide a power gain of an unexpected high order value. The reliable and positive acting nature of the steering control unit and monitor unit are therefore believed to constitute definite advances in the art.

Where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. In a guidance system for a mobile unit for guiding the unit along a predetermined path which unit includes steering control means, and a light source for projecting light to said path for reflection purposes, light responsive means mounted on said unit comprising two light responsive cells having the outputs thereof oppositely coupled in a loop circuit, a pair of transistors each having an emitter, base and a collector, and a pair of current-flow controlling devices, the base of each transistor being coupled to a different branch of the loop circuit, the collector of each transistor being connected to said steering control means, and the emitter of each transistor being coupled to each other and to its respective base through one of said current-flow controlling devices, whereby signals directed to the base of one transistor by increased energization of one of said cells and decreased energization of the other cell responsive to the displacement of the respective cells from the path in a given direction, will be amplified by energization of said one transistor to operate said steering control means, and whereby the other transistor will be cut off.

2. In a guidance system for guiding a mobile unit along a predetermined path, which unit includes light responsive means mounted on said unit comprising a pair of cells connected in an opposed loop circuit, steering control means on said unit operatively connected to said unit to steer the same, a light source carried by said unit and adapted to project light to said path and be reflected to said light responsive means, and a source of energy; transistor means operatively connected to said source of energy and controlled by the signal output of said loop to activate said steering control means whereby said steering control means will control the direction of movement of said unit, an additional light responsive means comprising a pair of light responsive cells oppositely coupled in a second loop, one of said cells arranged to be responsive to light reflected from said path and the other arranged to be directly responsive to the output of said light source, switch means for controlling the coupling of power from said source of energy to the propulsion means for said mobile unit and a transistor having a base coupled to one branch of said second loop, an emitter coupled to a second branch of said second loop and through a biasing means to said base; and a collector coupled to said switching means whereby differential signals from said pair of light responsive cells of said second loop control operation of said transistor in the control of said switch means.

3. In a guidance system for guiding a mobile unit along a predetermined path, which unit includes steering means operatively connected to steer the unit, and a light source for projecting light on said path for reflection purposes, light responsive means mounted on said unit comprising two light responsive cells oppositely coupled in a loop, a pair of transistor devices each having an emitter, base and collector, a pair of rectifiers the base of each transistor being coupled to a different branch of the loop between said cells, the collector of each transistor being connected to said steering control means, and the emitter of each transistor being coupled to each other and to its respective base through one of said rectifiers, whereby signals directed to the base of one transistor by increased energization of one of said cells and decreased energization of the other cell responsive to displacement of the respective cells from the path, will be amplified by energization of said one transistor to operate said steering control means, and whereby the other transistor will be cut off.

4. In a guidance system for guiding a mobile unit along a predetermined path, which unit includes steering control circuit means on said unit operatively connected to said unit to steer the same, and a light source carried by said unit adapted to project light to said path for reflection purposes; light responsive means including a pair of self generating energy devices, each of which has a negative and positive polarity terminal, and at least one of said devices being located on said mobile unit to respond to changes in the intensity of said reflected light, means for connecting opposite polarity terminals of the devices to each other, a first means for deriving a first signal from the connection which extends between one pair of opposite polarity terminals, a second means for deriving a second signal from the connection which extends between the second pair of opposite polarity terminals, the output signals of said first and second means thereby being of a different relative polarity and of a value related to the algebraic sums of the individual outputs of said devices, and circuit means for coupling the signal output of said first and second means to said steering control circuit means.

5. In a guidance system for guiding a mobile unit along a predetermined path, which unit includes steering control means in said unit operatively connected to said unit to steer the same, and a light source carried by said unit adapted to project light to said path for reflection purposes; light responsive means including a pair of self generating energy devices, each of which has a positive and a negative polarity terminal, at least one of said devices being mounted to respond to changes in the intensity of the reflected light; means for connecting the opposite polarity terminals of the device to each other, a first means for deriving a first signal from the connection which extends between one pair of opposite polarity terminals, a second means for deriving a second signal from the connection which extends between the second pair of opposite polarity terminals; means for adjusting the value of the signal output of the other of said devices to a prefixed value which is less than the other of said cells with said mobile unit in a given position relative to said path, and to maintain said value responsive to changes in the path position of said mobile unit, and circuit means operatively controlled by the signals of said first and second means to control the coupling of energy to the propulsion means for said mobile unit.

6. In a guidance system for guiding a mobile unit along a predetermined path which unit includes a steering control means for steering the unit, a light source carried by said unit to project light on said path for reflection purposes and an energy source; a first light responsive means including a first and a second cell connected in an opposed loop and supported on said unit for energization by the reflected light, switching means for coupling energizing signals to said steering control means connected for control by the signal output of said opposed loop; a second light responsive means including a second set of cells connected in a second opposed loop at least one of which is energized by light reflected from said path and the other of which is energized by direct light from said source, and means controlled by the signal output of said second opposed loop to control the coupling of power from said energy source to said mobile unit.

7. In a guidance system for guiding a mobile unit along a predetermined path, which unit includes steering control means including a member having a first and a second steering control element for controlling the steering of the unit in two opposite directions, and a light source carried by said unit to project a light on said path for reflection purposes; light responsive means comprising a first and a second light responsive cell, each of which includes a first output terminal of one polarity and a second output terminal of another polarity, a first output means for interconnecting the first terminal of one cell to the second terminal of the other cell, and a second output means for interconnecting the second terminal of said one cell to the first terminal of the other cell whereby a lateral change in the position of the unit relative to said path will effect a rapid change in the signal output of both cells over said output circuits, a first switching means connected between the one output circuit of said loop and the first control element of said steering control means for effecting the steering of the mobile unit in one of said directions, and a second switching means connected between the second output means of said loop and the second steering control element for effecting steering of the mobile unit in the opposite direction, whereby said first and second switching means are operative with a departure of the mobile unit from the path to effect a more expeditious adjustment of the steering control mechanism and the return of the unit to said path.

8. In a guidance system for guiding a mobile unit along a predetermined path which unit includes steering control means for steering same, and a light source carried by said unit to project a light on said path for reflection purposes; light responsive means including a first and a second light responsive cell, each of which has a first and a second terminal of different polarities, one of which cells is operative to provide a signal output which is dependent upon the value of the light reflected thereto from said path, and the other of which cells is controlled directly by said source to provide a reference signal, a first output means for interconnecting the first polarity terminal of one cell and the second polarity terminal of the second cell, and a second output means for connecting the second polarity terminal of the second cell with the first polarity terminal of said one cell, whereby lateral movement of the unit from said path effects an output signal over said first and second output paths of a value which is related to the departure distance, a switching device for interrupting the power supply for said system, and means for coupling the first and second output circuit to said switching device to effect operation thereof in the interruption of said power supply whenever the unit is moved a predetermined distance laterally of said path.

References Cited in the file of this patent
UNITED STATES PATENTS

| | | |
|---|---|---|
| 1,877,279 | Dawson | Sept. 13, 1932 |
| 2,065,758 | Shepard | Dec. 29, 1936 |
| 2,074,251 | Braun | Mar. 16, 1937 |
| 2,424,288 | Severy | July 22, 1947 |
| 2,493,755 | Ferill | Jan. 10, 1950 |
| 2,506,384 | Rich | May 2, 1950 |
| 2,684,459 | Brown et al. | July 20, 1954 |
| 2,809,303 | Collins | Oct. 8, 1957 |
| 2,820,143 | D'Nelly et al. | Jan. 14, 1958 |